United States Patent [19]

Horiuchi

[11] E Patent Number: Re. 31,711

[45] Reissued Date of Patent: Oct. 23, 1984

[54] VARIABLE DELIVERY HYDRAULIC PUMP

[75] Inventor: Takeshi Horiuchi, Ibaraki, Japan

[73] Assignee: Daikin Kogyo Co., Ltd., Osaka, Japan

[21] Appl. No.: 21,425

[22] Filed: Mar. 16, 1979

Related U.S. Patent Documents

Reissue of:

[64] Patent No.: 4,072,442
Issued: Feb. 7, 1978
Appl. No.: 700,953
Filed: Jun. 29, 1976

[30] Foreign Application Priority Data

| | | | |
|---|---|---|---|
| Jul. 4, 1975 | [JP] | Japan | 50/82871 |
| Mar. 15, 1976 | [JP] | Japan | 51/28458 |
| Apr. 6, 1976 | [JP] | Japan | 51/38904 |

[51] Int. Cl.[3] ..... F04B 1/26
[52] U.S. Cl. ..... 417/222
[58] Field of Search ..... 417/212, 218, 222; 91/506; 60/445

[56] References Cited

U.S. PATENT DOCUMENTS

| | | | |
|---|---|---|---|
| 2,931,176 | 4/1960 | Bloch et al. | 417/218 |
| 3,188,971 | 6/1965 | Puryear | 417/222 |
| 3,625,637 | 12/1971 | Kiwalle | 91/506 |
| 3,750,405 | 8/1973 | Lech et al. | 60/445 |
| 3,861,145 | 1/1975 | Hall et al. | 60/445 |
| 3,924,969 | 12/1975 | Rometsch | 417/218 |
| 3,952,509 | 4/1976 | Coleman | 60/445 |
| 3,959,969 | 6/1976 | Tittmann | 60/445 |

FOREIGN PATENT DOCUMENTS

| | | | |
|---|---|---|---|
| 1033333 | 6/1966 | United Kingdom | 417/218 |
| 1242239 | 8/1971 | United Kingdom | 417/222 |

*Primary Examiner*—William L. Freeh
*Attorney, Agent, or Firm*—Cushman, Darby & Cushman

[57] ABSTRACT

A variable display hydraulic pump having at least one pilot plunger, an operating plunger for adjusting the displacement of variable control element, and a first and a second spool for controlling travels of the plungers towards the variable control element side so that a single pumping element may precisely, stably carry out the two pressure-two volume control of the pump.

14 Claims, 15 Drawing Figures

VARIABLE DELIVERY HYDRAULIC PUMP

Matter enclosed in heavy brackets [ ] appears in the original patent but forms no part of this reissue specification; matter printed in italics indicates the additions made by reissue.

This invention relates to a variable delivery hydraulic pump and more particularly to a variable delivery hydraulic pump providing a housing having a suction and a discharge port, a variable control element, and a pumping element exerting pumping in contact with the variable control element so that the variable control element may be adjusted in displacement thereof to carry out the two pressure-two volume control of the pump.

Figure 15:
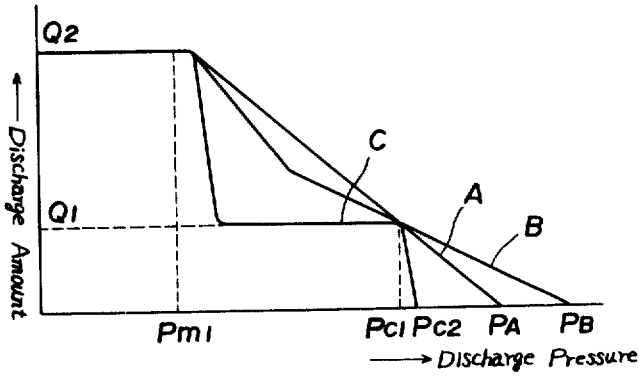

A conventional variable delivery pump employs one pump to carry out two pressure-two volume control by setting the pressures $Pm_1$ and $Pc_1$ at the low and the high pressure lines respectively under the characteristics as shown by the curves A and B in FIG. 15, where not only the pressure $Pc_1$ is hard to be set but also the fluid discharge amount $Q_1$ corresponding thereto is liable to change following variation of the pressure $Pc_1$, hence, the pump has such a defect as an unstable control from its fluctuant accuracy.

In such conventional pump, since the relief pressures (the maximum discharge pressure) $P_A$ and $P_B$ are high and the required horse power within the range of the above pressures $Pm_1$ and $Pc_1$ is large, the pump is also defective in more power loss and heat generation.

Briefly, the aforesaid two pressure-two volume control is performed under the characteristics shown by the curves A and B, i.e., under those accessible to the constant horse power characteristics, so that the discharge amount $Q_1$ under the pressure $P_2$ at the high pressure line is unstable to result in the aforesaid defects.

There has hitherto been suggested a pump aiming at eliminating the aforesaid defects by use of two hydraulic pumps having the characteristics as shown in the curve C at FIG. 15. The pump of this system, however, has the defects such that, first, the requirement of two pumps and further an unloading pressure control valve for setting the pressure $Pm_1$ at the high pressure line as well, makes the pump expensive to manufacture and disadvantageous to be restricted in a space for use due to its wholly large-sized structure, and second, the pressure $Pc_1$ set by the relief valve causes the pump to be more defective in power loss of heat generation compared with the former conventional control system.

The two pressure-two volume control system of the invention mainly adopts the combination of low pressure-large volume and high pressure-small volume control, which is described in that, for example, when an actuator is exerted with the hydraulic pump, there are three conditions such that rapid traverse of a tool attached to the actuator under the control of the low pressure-large volume characteristics in light load until the tool contacts with a workpiece, slow traverse under the control of high pressure-small volume characteristics in heavy load of machining the workpiece, and rapid return under the former control in light load when the tool restores after its work finish.

There are other two pressure-two volume controls, such as combination of high pressure-two volume control.

The invention aims at providing a variable delivery hydraulic pump controllable of the abovementioned two pressure-two volume system by means of a single pump, of which a main object is to provide a variable delivery hydraulic pump capable of exerting the aforesaid two pressure-two volume control by use of a single hydraulic pump, easy to settle each of the two pressures and two volumes, and accurate and stable in its each control.

Another object is to provide a variable delivery hydraulic pump automatically operable of the two pressure-two volume control following the change of load pressure, namely, the rapid traverse of tool under, for example, the control of the low pressure-large volume characteristics in light load prior to contact of the tool with the workpiece, can be automatically changed to the slow under that of the high pressure-small volume characteristics in heavy load of machining the workpiece.

Still another object is to provide a variable delivery hydraulic pump capable of exerting the two pressure-two volume control by means of changing a directional control valve, which pump is changeable by operating the directional control valve, for example, from the high pressure-large volume to the high pressure-small volume control characteristics.

A further object is to provide a variable delivery hydraulic pump operable under the two pressure-two volume control by being automatically changed following the load pressure variation and by being changed with the directional control valve as the abovementioned, that is, the pump of the so-called combination control of composite type.

Still a further object is to provide a variable delivery hydraulic pump optionally selective of the aforesaid control systems by use of a simply interchangeable valve block.

The invention has been designed to build up the pump provided with at least one pilot plunger and a control plunger, for adjusting the displacement of the variable control element; a first and a second spool for controlling the plungers in travels thereof towards the variable control element side, into each one end of which spools is introduced the fluid discharge pressure and at each of other end is provided a push member against a push of the spool from the discharge pressure respectively; and at spool chambers receiving spools therein respectively are formed control conduits which are opened when the spools travel against the push member's biasing force so as to to be connected to either the rear chamber of the pilot plunger or the back chamber of the control plunger, thereby making it possible to carry out the two pressure-two volume control.

Figure 1:
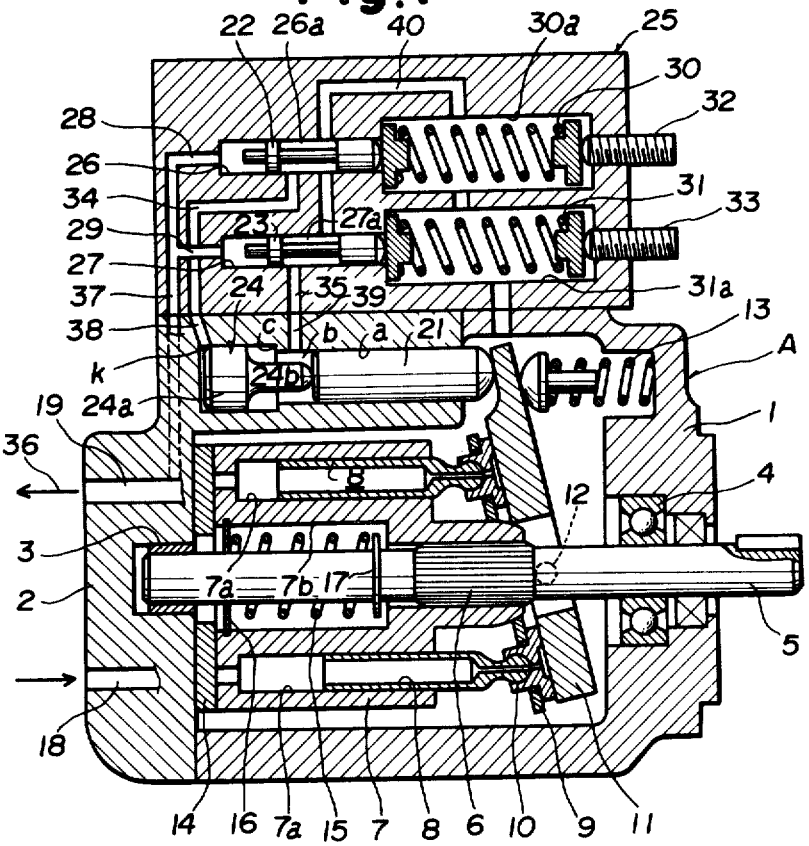
Figure 2:
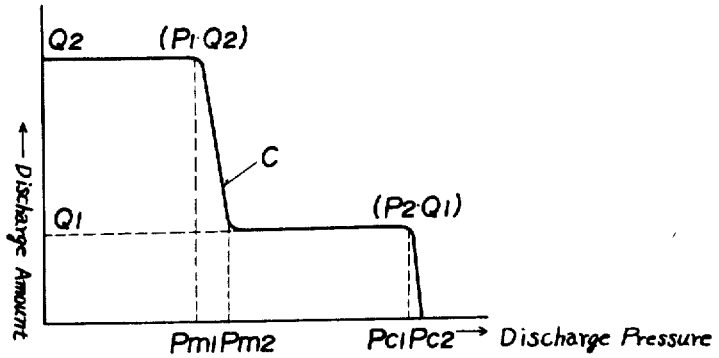
Figure 3:
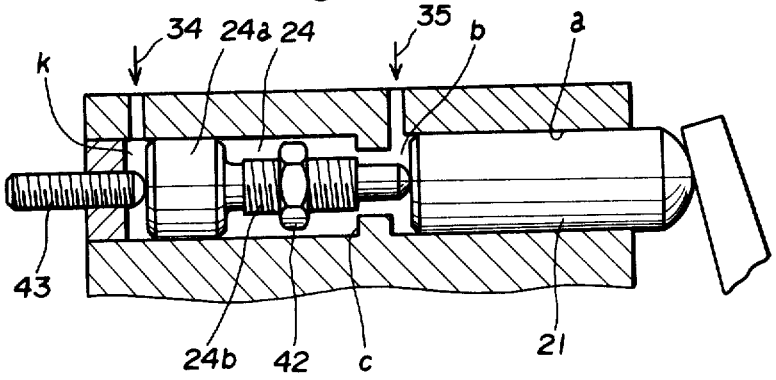
Figure 4:
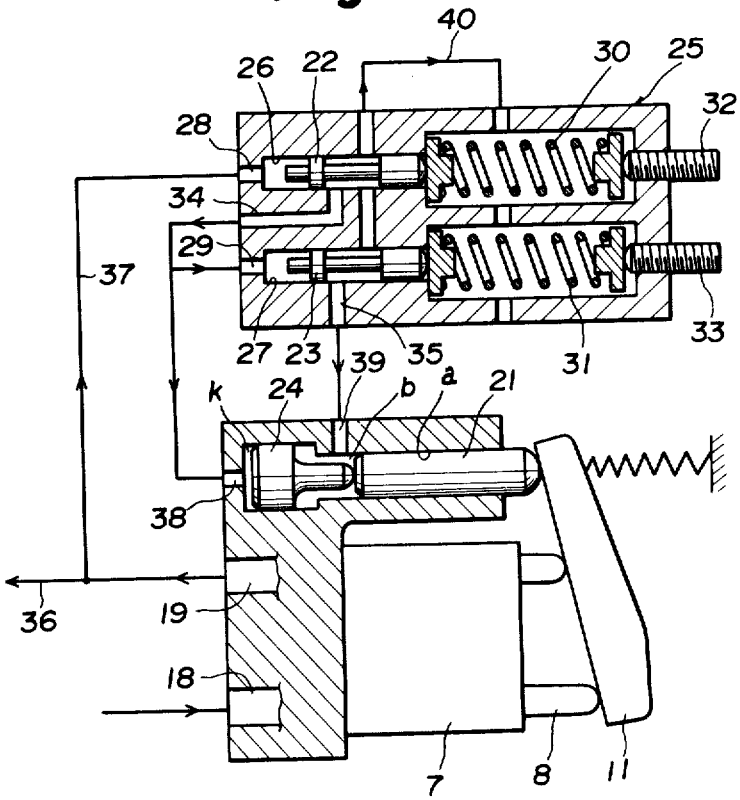
Figure 5:
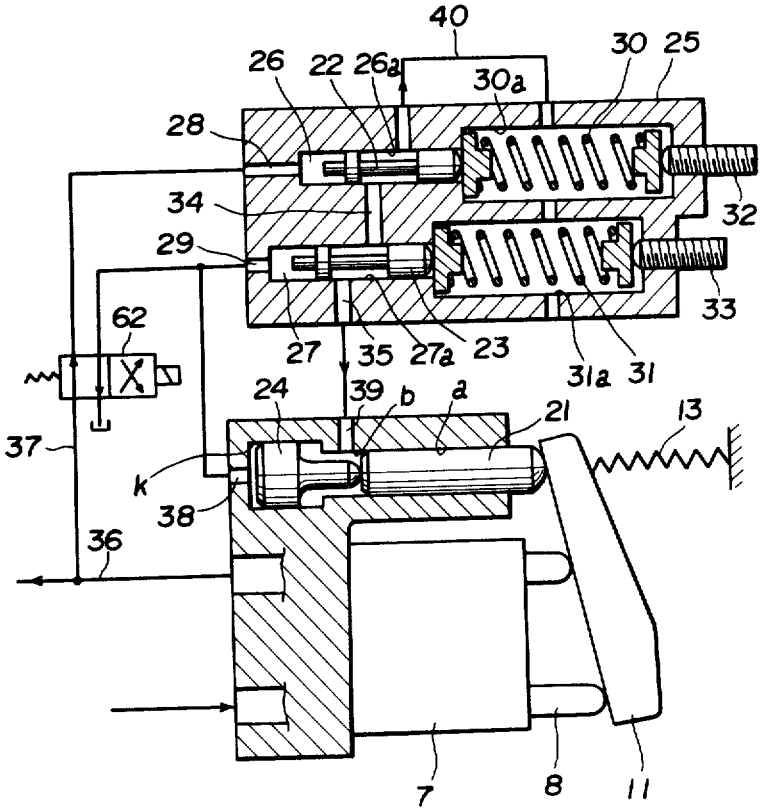
Figure 6:
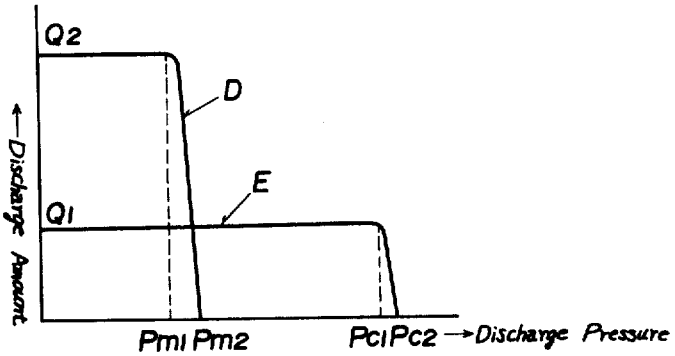
Figure 7:
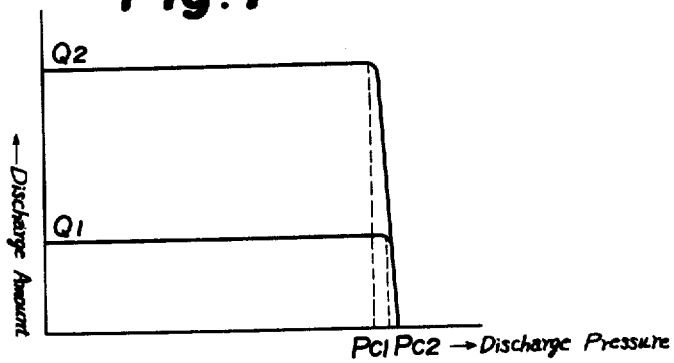
Figure 8:
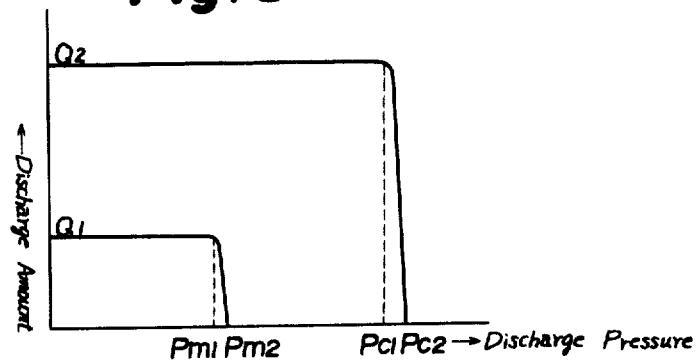
Figure 9:
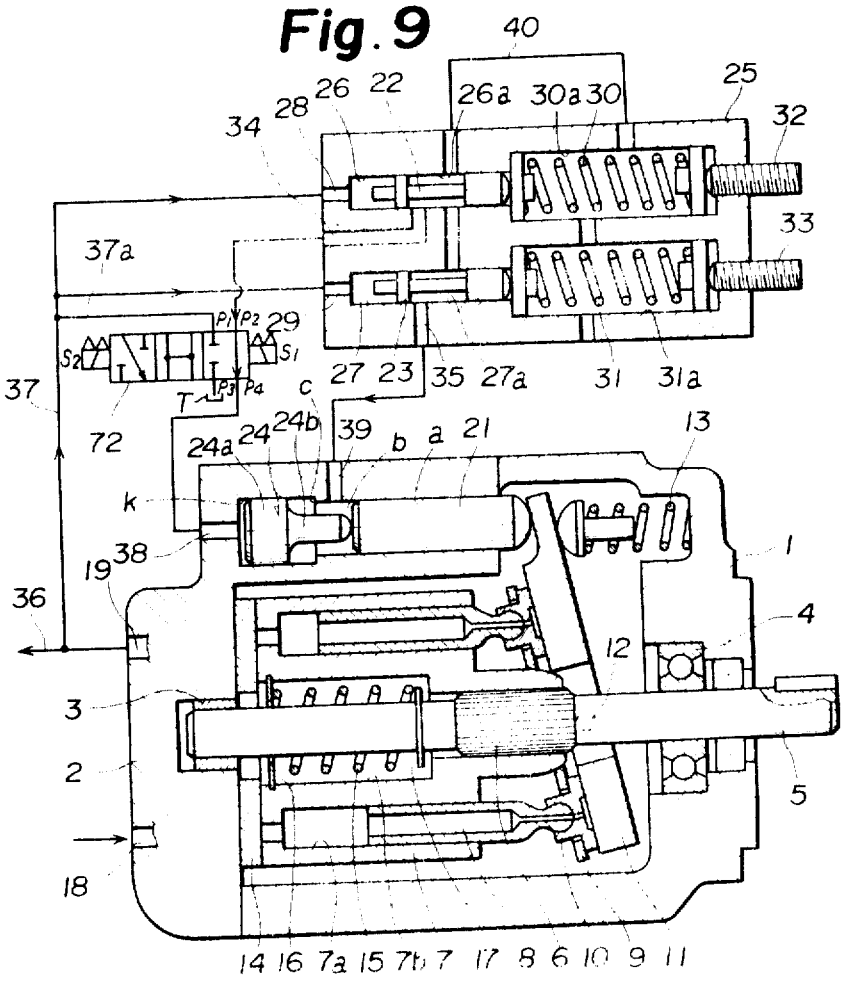
Figure 10:
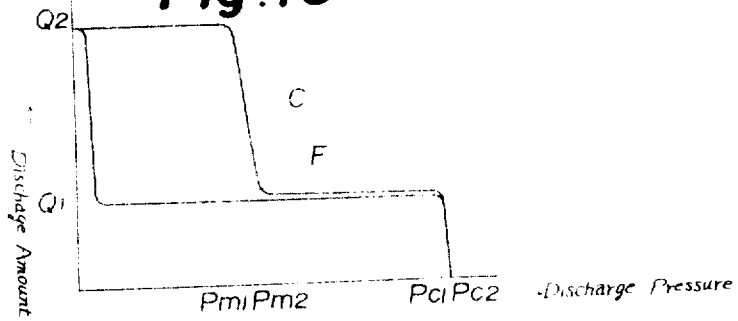
Figure 11:
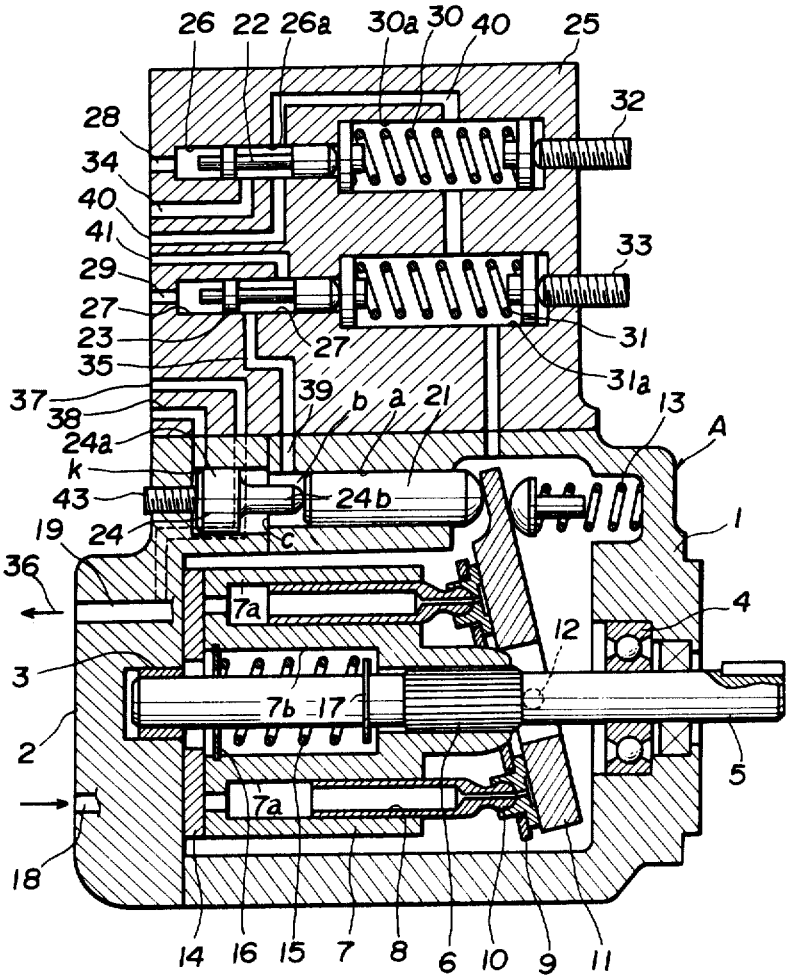
Figure 12:
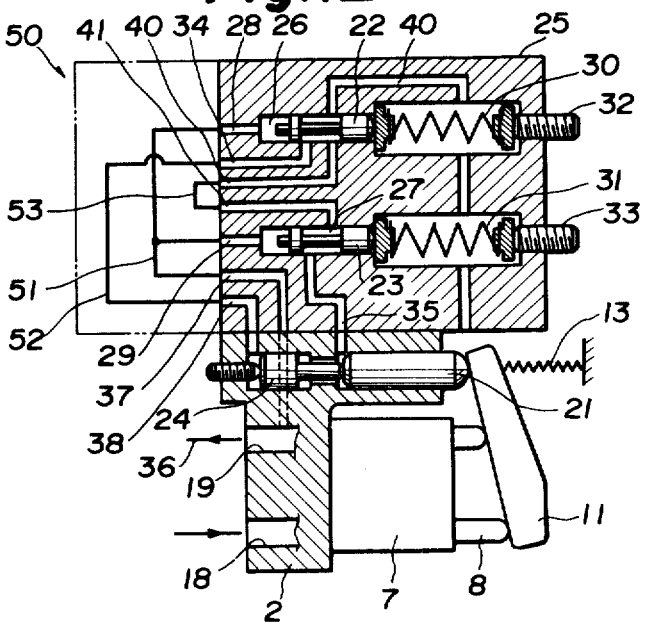
Figure 13:
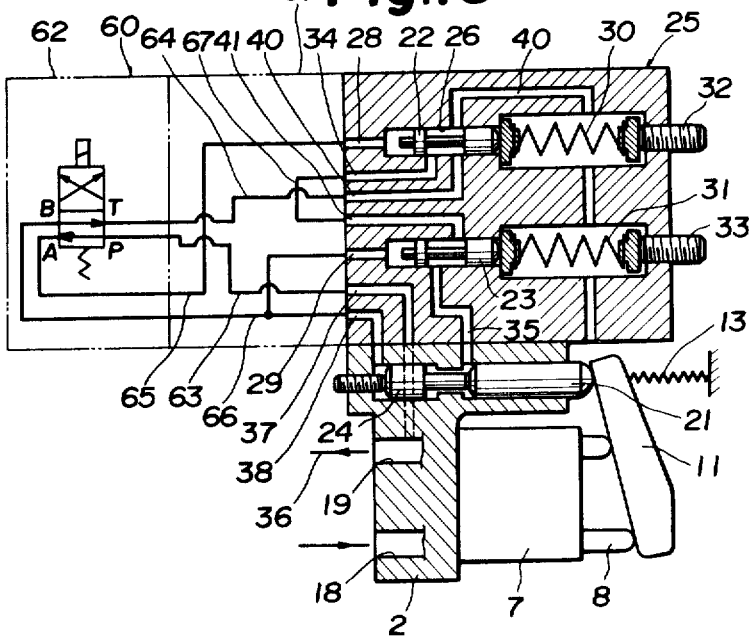
Figure 14:
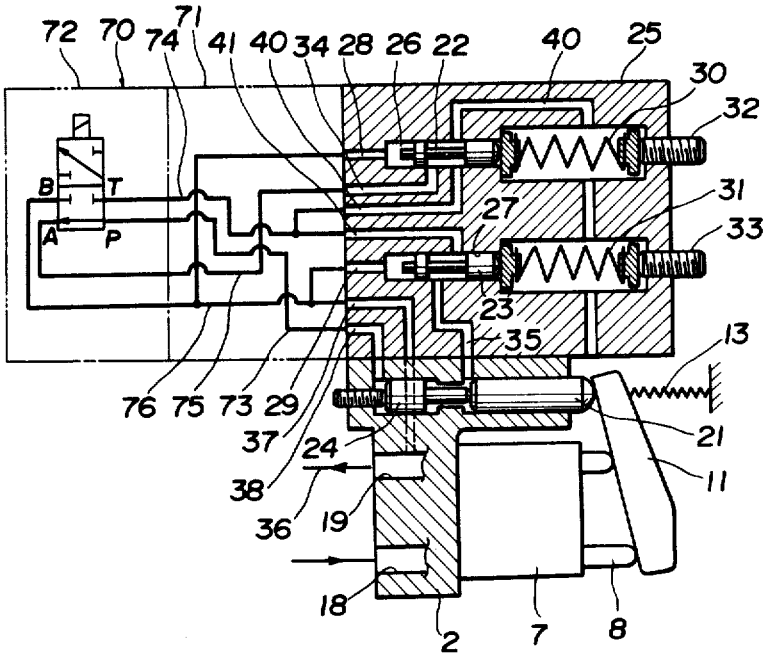

Other objects and features of the invention will become apparent from the following description of embodiments with reference to the accompanying drawings, in which:

FIG. 1 is a longitudinal section of a variable delivery hydraulic pump of the combination control by system pressure, embodying the present invention, FIG. 2 is a graph of control characteristics of the pump in FIG. 1, FIG. 3 is a partially enlarged section showing the structure adjusting strokes of a pilot plunger and a control plunger, FIG. 4 is a longitudinal section of a modified embodiment of the combination control by system pressure, FIG. 5 is a longitudinal section of the pump of the combination control by directional control valve, showing another modified embodiment of the invention, FIGS. 6 through 8 are graphs of control characteristics of the pump shown in FIG. 5, FIG. 9 is a longitudinal section of the pump of the combination control of composite type, showing a further modified embodiment of the invention, FIG. 10 is a graph of control characteristics of the pump shown in FIG. 9, FIG. 11 is a partially sectional view of the pump of a control block system showing still a further embodiment of the invention, FIGS. 12 through 14 showing applications of each of the control systems, FIG. 12 is a schematic illustration showing the control block applied to the combination control by system pressure, FIG. 13 is a schematic illustration showing the control block applied to the combination control by directional control valve, FIG. 14 is a schematic illustration showing the same block applied to the combination of composite type, and FIG. 15 is a graph showing a conventional two pressure-two volume control characteristics.

Referring to the drawings, a swash plate type axial piston hydraulic pump is shown as a typical variable delivery hydraulic pump in accordance with the invention. The reference A designates a housing constituting a principal portion of the piston pump, accommodating the pumping element to be hereinafter described.

The housing A comprises a hollow main body 1 and a valve block 25, at one side of which main body is fixed a cover 2 with four mount bolts (not shown). The main body 1 and the cover 2 are sealed with an O-ring or the like and the former is fitted with a bearing 4 and the latter with that 3, the bearings 3 and 4 rotatably supporting a drive shaft 5 therewith.

The drive shaft 5 carries a cylinder block 7 building up the pumping element through a spline coupling formed at substantially the intermediate portion of the shaft, the cylinder block 7 being rotatable together with the drive shaft 5 following the rotary torque therefrom.

The cylinder block 7 has a plurality of cylinders 7a axially extending and housing therein axially movable pistons 8 respectively. The pistons 8 have spherical heads insertibly engaged with shoes 10 held by retainers 9 respectively, through which shoes 10 the pistons are abutting against a swash plate serving as the variable control element.

At the center of the cylinder block 7 is formed a bore 7b of a larger diameter than an outer diameter of the drive shaft 5 so that an axially extending annular space is formed between the inner surface of the bore 7b and the outer periphery of the drive shaft 5, the space receiving therein a spring means 15 for urging the cylinder block 7 towards the valve plate 14. The spring 15, which is mounted between a seat 16 at the valve plate 14 side of the cylinder block 7 and a shoulder 17 formed at the spline coupling 6 side of the drive shaft 5, is adapted to urge the cylinder block 7 towards the valve plate 14.

The valve plate 14, which is attached close to the inner surface of the cover 2 in non-rotatable relation, serves to alternately communicate each of the cylinders 7a of the cylinder block 7 with a suction conduit 18 and a discharge conduit 19 displaced at 180° phase therefrom. The function of the valve plate 14 is that in a suction stroke of the piston 8 the cylinder 7a communicates with the suction port at the valve plate 14 so that the fluid is introduced into the cylinder 7a from the suction conduit 18, while, in a discharge stroke of the piston the cylinder 7a communicates with the discharge port at the valve plate 14 so that the fluid in the cylinder 7a is discharged through the discharge conduit 19.

The swash plate 11 is easily swingable at the fulcrum of the trunion 12, urged towards a control plunger 21 to be hereinafter described, by means of a spring 13 inserted between the rear of the plate and the inner surface of the body 1, and normally inclined at the maximum angle as shown is FIG. 1.

The cylinder block 7 rotates through the drive shaft 5 to allow each piston 8 to reciprocate in the cylinder 7a so that the fluid may be discharged at the maximum amount when the swash plate 11 is maximumly inclined, the slant angle being changeable to obtain a desirable discharge amount.

The aforesaid principal obstruction of the swash plate type axial piston pump is well known.

Next, the two pressure-two volume control by the swash plate slant angle adjustment will be described as for the aforesaid pump.

The two pressure-two volume control of the invention is, as shown in FIGS. 2, 6 and 10, combined mainly of the low pressure-large volume and high pressure-small volume control, besides this, there are combinations of the high pressure-large volume and low pressure-small volume control as in FIG. 8, and the equivalent pressure-two volume control as in FIG. 7.

The two pressure-two volume control includes; the combination control by system pressure, automatically changeable of the flow rate by variable discharge pressure from the pumping element, i.e., variable load pressure; the combination control by directional control valve, changeable of the flow rate by a control valve; and the combination control of composite type, combined with both the combination control by system pressure and that by directional control valve.

In greater detail, application of the control systems will be exemplified by the press work for pressing a workpiece with a punching tool attached to an actuator connected to the pump, as follows:

First, the combination control by system pressure is available for punching a workpiece such as rubbery material or a thick metal sheet because of being automatically changeable from the low pressure-large volume to the high pressure-small volume by means of load pressure alternation, that is, the punching tool is, in rapid traverse, brought into contact with the workpiece under the low pressure-large volume control, and upon rise of the load pressure (the discharge pressure) caused by the contact the pump is automatically changed to the high pressure-small volume control so that the tool may, in slow traverse, punch the workpiece.

Second, the combination control by directional control valve is capable of alternating the low pressure-large volume and high pressure-small volume control by means of the directional control valve, of changing therefrom to the equivalent pressure-two volume control, or of changing from the low pressure-small volume to the high pressure-large volume. The combination is available, for example, for punching a thin metal sheet in accompanying with a fear of causing distortion in the workpiece, which is applied in such a manner that the tool is, first, rapidly traversed under the low pressure-large volume control, thereafter, once stopped just before the workpiece, and is changed to the slow to be in contact with the workpiece for punching it, thus the machining is finished.

Also, the aforesaid equivalent pressure-two volume control in this control system is effective in that different works or rough and finish cuttings require the alternation of the tool traverse speed, and that alternation of the low pressure-small volume and high pressure-large volume controls is applied for interchanging the cutting and travel of workpiece in machining.

Third, the combination control of composite type, which is combined of the combination control by system pressure with that by directional control valve, is available for changing the workpiece in its material, thickness or size, at the press work.

Now, the principal element adjusting the slant angle of the swash plate 11 in the aforesaid control feature and system, will be described as follows:

The element comprises at least one of pilot plunger 24 and a control plunger 21, which are assembled into the cover 2, and a first and a second spools 22 and 23, fabricated into the valve block 25. Each of the element is connected with each other through a present conduit, and the pilot plunger 24 and control plunger 21 are travelled towards the swash plate 11 by means of the discharge pressure and the control pressure reduced therefrom, so that the swash plate 11 may be adjusted in its slant angle to thereby carry out the aforesaid fluid control, the reduced control pressure being against the inclined moment of the swash plate 11 and the force of the spring 13.

Furthermore, the element will be detailed in the following. The control plunger 21 is axially movably inserted in a cylinder chamber a formed in parallel to the axis of the drive shaft 5, the tip of the plunger 21 projects from the chamber a to abut against the swash plate 11, and at the backside of the plunger is formed a back chamber into which the pilot plunger 24 is axially movably inserted.

The pilot plunger 24, which serves to settle the discharge amount in the pump characteristics under the high pressure-small volume and low pressure-large volume, is composed of a larger diameter portion 24a and a small diameter one 24b, the former dividing the back chamber into a front chamber b and a rear one k. The small diameter portion 24b is abutted at its tip against the back of the plunger 21 and the large diameter portion 24a is formed to be restricted in a given stroke from its travel towards the swash plate by a contact at the shoulder of the large diameter portion 24a with a stopper c which is formed at substantially the middle portion of the back chamber of the control plunger thereby enabling the control plunger to be axially moved in a regular stroke towards the swash plate 11. In addition, the small diameter portion 24b is provided at its outer periphery with a screw thread and an adjusting means 42 screwable therewith so that the pilot plunger 24 may, as shown in FIG. 3, be optionally controlled in its travelling stroke to thereby adjust the discharge amount at the small volume control. An adjuster 43 in contact at the tip thereof with the rear surface of the pilot plunger 24 is screwably mounted to the cover 2 for adjusting the stroke of control plunger, thereby adjusting the maximum slant angle of the swash plate 11, i.e., the maximum fluid discharge amount. The pilot plunger stroke adjustment may be carried out by means of a movable stopper c, also operable from the outside of the cover 2.

The spools 22 and 23 are axially movably inserted into spool chambers 26 and 27 respectively and are made to communicate at one end of each of the spools with the discharge conduit 19 at the high pressure line 36 through the high pressure conduit 37 and guide conduits 28 and 29 so that the discharge pressure from the discharge outlet 19 may allow the spools 22 and 23 to travel.

At the rear side of each of the spools 22 and 23 are provided push members 30 and 31 against the spool travel, mainly formed of spring means respectively. The push members 30 and 31 are against the discharge pressure led into the spool chambers 23 and 23 and restrict the spools 22 and 23 from their travels until the discharge pressure exceeds the predetermined value.

The two pressure-two volume control: the low pressure-large volume and high pressure-small volume, varying the travel of each of the spools 22 and 23 caused by the biasing forces of the push members 30 and 31, can be carried out in such a manner that the pressure $Pm_l$ at the low pressure control is settled by reducing the biasing force of the push member 30 corresponding to the first spool 22 and the pressure $Pc_l$ at the high pressure control by enlarging that of the push member 31 to the second spool 23.

The biasing force of each of the push members 30 and 31 can be optionally settled with the biasing force adjusting screws 32 and 33 provided at the valve block 25 correspondingly to both the members respectively, the screws 32 and 33 serving to control the pressures $Pm_l$ and $Pc_l$ at the low and the high pressure controls respectively.

At substantially the intermediate portion of each of the spool chambers 26 and 27 are provided a first and a second control conduits 34 and 35, opening into the spool chambers by travels of the spools 22 and 23 to communicate with the guide conduits 28 and 29 respectively, so that the control pressure indicated into the first and second control conduits 34 and 35 through openings thereof may permit the pilot plunger 24 and control plunger 21 or only the latter to be axially moved towards the swash plate 11.

The aforesaid construction, which is principal to regulate the pumping characteristics under the two pressure-two volume control by adjusting the swash plate 11 slant angle, may be so formed that the biasing forces of the push members 30 and 31, the connection of the first and second control conduits 34 and 35, and that of the control guide conduits 38 and 39 communicating with the front chamber b and rear chamber k of the pilot plunger 24 at the back chamber of the control plunger 21, can be changed to perform the same control of the aforesaid feature and system.

Next, the combination control by system pressure, by directional control valve, and of composite type, carrying out the two pressure-two volume control based on the aforesaid construction, will be concretely detailed in the following.

First, the variable delivery hydraulic pump employing the combination control by system pressure for the two pressure-two volume control as shown in FIG. 2, will be described in accordance with FIG. 1, as follows:

The pressure $Pm_l$ at the low pressure control and that $Pc_l$ at the high pressure are settled by the first and second push members 30 and 31 corresponding to the first and second spools 22 and 23 respectively, in a manner that the biasing force of the first push member 30 is made smaller than that of the second member 31, and the first control conduit 34 is connected to the guide conduit 38 communicating with the rear chamber k of the pilot plunger 24 and the second control conduit 35 to the guide conduit 39 communicating with the front chamber b of the same at the back chamber of the control plunger 21. Referring to FIG. 1, the pilot plunger 24 and the control plunger 21 are both located at the left side and the swash plate 11 is at the maximum slant angle thereof, in which the rotation of drive shaft 5 causes the pistons 8 at the cylinder block 7 to be axially reciprocated so that the fluid may, under its maximum flow rate, be discharged from the discharge conduit 19 to the high pressure line 36.

Then, a part of the fluid flows through the high pressure line conduit 37 from the discharge conduit 19 to the guide conduits 28 and 29 provided at one end of each of both the spools 22 and 23, and enters the spool chambers 26 and 27 thereby urging rightward the spools 22 and 23 therein. In this instance, being biased leftward by the push members 30 and 31 respectively, no travel of each of the spools 22 and 23 occurs until the discharge pressure becomes over the biasing forces of the push members. The push member 30 is, as aforesaid, smaller in its biasing force than that 31, hence, the discharge pressure from the conduit 19 firstly oercomes the biasing force of the former so as to force the spool 22 to travel rightward, as the result, the first control conduit 34 is opened to lead therethrough the fluid under the control pressure into the rear chamber k of the pilot plunger 24 so that both the plungers 24 and 21 may simultaneously be axially moved rightward to decrease the swash plate 11 slant angle, where the displacement thereof is equal to the extent of the stroke of the pilot plunger 24.

In the pump's running under the low pressure as shown by the curve C in FIG. 2, the swash plate 11 being the maximum at its slant angle and the discharge amount at the maximum $Q_2$, the spool 22, as the aforesaid, begins to travel for rightward urging the control plunger 21 when the discharge pressure rises to reach $Pm_1$, so that the swash plate 11 is reduced in its slant angle to yield the discharge amount $Q_1$ and the pressure $Pm_2$, the discharge amount $Q_1$ depending upon the stroke of the pilot plunger 24. Its maximum stroke is defined by the travel of pilot plunger until the larger diameter portion 24a comes into contact with the stopper c at the front chamber b, where the pump is kept in the low pressure-large volume control until the discharge pressure becomes $Pm_1$ as aforesaid, thereafter, the pressure rise permits the pump to automatically changed to the high pressure-small volume control.

In the pump operation under the high pressure-small volume control characteristics, the discharge pressure rises to the pressure $Pc_1$ over the biasing force of the push member 31 relative to the spool 23, for example, at the final stroke of punching after completion of molding a workpiece in the press work, then the second spool 23 initiates to travel rightward against the push member 31, whereby the second control conduit 35 is opened to allow the fluid control pressure to enter the front chamber b: the back chamber of the control plunger 21, so that the plunger 21 may rightward be urged for minimizing the slant angle of the swash plate 11.

Thus, the construction shown in FIG. 1 is available for automatically obtaining the fluid control, as shown in FIG. 2, from the low pressure-large volume by means of the combination control by system pressure to the high pressure-small volume. In addition, the pressures $Pm_1$ and $Pc_1$ at the low and high pressure respectively are optionally adjustable with the adjust screws 32 and 33, and the discharge amount $Q_2$ at the low pressure-large volume and $Q_1$ at high pressure-small volume control can be so with the adjusters 42 and 43.

The aforesaid combination control by system pressure providing the guide conduits 28 and 29, opened into the spool chambers 26 and 27, and connected to the conduit 37 at the high pressure line respectively, the guide conduit 29 opening into the second spool chamber 27 may, as shown in FIG. 4, be communicated with the first control conduit 34.

Incidentally, in FIGS. 1 and 4 the numeral reference 40 designates a line connected to a sump (not shown) through the housing body 1, connecting the secondary sections 26a and 27a of the spool chambers 26 and 27 with the push-member-receiving-chambers 30a and 31a respectively.

Second, the two pressure-two volume control by directional control valve will be described referring to FIG. 5.

In the drawing, the first control conduit 34 communicates with the secondary section 27a of the second spool chamber 27 and the second control conduit 35 with the front chamber b of the pilot plunger 24: the back chamber of the control plunger 21, through the guide conduit 39, the rear chamber k of the pilot plunger 24 communicates with the guide conduit 29 for the second spool 23 through the guide conduit 38, and between the guide conduits 28 and 29 corresponding to the first and second spool 22 and 23 respectively and the conduit 37 at the high pressure line connected to the outlet 19 is inserted a solenoid directional control valve 62.

The directional control valve 62 employs, as shown in a symbol at FIG. 5, a four external port-two position directional control valve which is adapted to be changeable cooperatively with an actuator (not shown) connected to the high pressure line 36. For example, when the solenoid control valve is, as shown in FIG. 5, used, a limit switch (not shown) provided at a route where the actuator is exerted, is closed to yield electric signals for directionally changing the control valve.

Incidentally, the directional control valve 62 is free to use any valve other than the solenoid one, in which the control signals may be electrical or hydraulic or the like.

The hydraulic pump constructed as aforesaid can optionally carry out the low pressure-large volume and the high pressure-small volume controls of the characteristics as shown in FIG. 6, the equivalent pressure-two volume control as shown in FIG. 7, or the high pressure-large volume and low pressure-small volume control as shown in FIG. 8.

In the case of exerting the two pressure-two volume control of the low pressure-large volume and high pressure-small volume control, shown in FIG. 6, the first push member 30 corresponding to the first spool 22 is, as in the construction shown in FIG. 5, reduced in its biasing force more than the second push member 31 corresponding to the second spool 23, thus, the pressure $Pm_1$ at the low pressure control being set by the biasing force of the first push member 30 and the pressure $Pc_1$ at the high by that of the second push member 31 respectively.

When the equivalent pressure-two volume control as shown in FIG. 7 is carried out, the first and the second push members 30 and 31 are equalized in their biasing forces, and when the two pressure-two volume control of the high pressure-large volume and low pressure-small volume as shown in FIG. 8 is performed, the biasing forces of the push members 30 and 31 are reversed to those shown in FIG. 6, namely, the pressure $Pc_1$ at the high pressure control is settled by the biasing force of the first push member 30 and the pressure $Pm_1$ at the low by that of the second push member 31.

Referring to FIG. 5, when the directional control valve 62 is located as in FIG. 5, the fluid from the outlet port 19 enters, as the same as shown in FIG. 1, the spool chamber 26 from the high pressure line conduit 37 through the guide conduit 28. When the fluid pressure overcomes the biasing force of the push member 30 corresponding to the spool 22, the spool 22 is forced to be rightward axially moved to open the port of the conduit 34 so that the fluid is led into the rear chamber b; the back chamber of the control plunger 21 through the secondary section 27a of the spool chamber 27, in which the biasing force of the push member 30 is, when settled to equal to the pressure $Pm_1$ at the low, applied to the control plunger to start its rightward travel, and finally, the swash plate slant angle becomes nearly zero to thereby make zero the discharge amount under the pressure $Pm_2$.

In addition, the hydraulic pump shown in FIG. 5 can be controlled at the settled biasing force of the push member 31 when the directional control valve 62 is leftward moved to be changed, namely, the same is controllable under the high prressure-small volume control by means of the biasing force settled as the pressure $Pc_1$ at the high pressure line.

In greater detail, the fluid flow from the discharge conduit 19 to the guide conduit 29 through the high pressure line conduit 37, is also led through the guide conduit 38 into the rear of the pilot plunger 24, i.e., the rear chamber k of the back chamber of the control plunger. When the fluid pressure, i.e., the discharge pressure, rises to overcome the sum of the inclined moment of the swash plate 11 and the force of the spring 13, the plunger 24 starts to be rightward urged so as to force the control plunger 21 to be axially moved thereby decreasing the swash plate slant angle, hence, the discharge amount becomes $Q_1$. Thereafter, the discharge pressure further rises to reach the pressure $Pc_1$, then the spool 23 begins to travel and rightward move the control plunger 21 as the same as in FIG. 1, so as to push the swash plate 11 until its slant angle becomes nearly zero, thus the discharge amount under the discharge pressure $Pc_2$ becoming zero.

The abovementioned description concerns the two pressure-two volume control: the low pressure-large volume and high pressure-small volume control, from which the controls shown in FIGS. 7 and 8 will be understood.

In addition, in the construction shown in FIG. 5, the control of characteristic indicated with the curve E in FIG. 6 is so carried out that the directional control valve 62 is displaced reversely of its position in FIG. 5, and the rear chamber k of the pilot plunger 24 and the high pressure line conduit 37 are made to directly communicate with each other. In this control valve change, if the discharge pressure is, as aforesaid, over the sum of inclined moment of the swash plate 11 and the force of the spring 13, at the same time of the change is rightward moved the pilot plunger 24 so as to allow the swash plate slant angle to be decreased to approach the center position thereof, hence, the characteristics shown in the curve E of FIG. 6 may immediately be obtained, while, if under the sum, the pump is kept in the low pressure-large volume control characteristic until the discharge pressure overcomes the sum, thus the pump being controlled under the two pressure-two volume characteristic. The force of the spring 13 can, however, be designed smaller, and the distribution pipe resistance at the discharge line 36 and the actuator operation load connected thereto usually cause the pump to be controlled under the high pressure-small volume at the same time of change of the directional control valve 62, whereby the pump control is changed from the low pressure-large volume to high pressure-small volume, thus the two pressure-two volume control being performed.

Third, the two pressure-two volume control composed of the combination control by system pressure and that by directional control valve, will be described as follows:

The control of composite type includes the two pressure-two volume control automatically obtainable, as shown in FIG. 2, by the system pressure and that by operating the directional control valve 62 as shown in FIG. 6, whose control characteristics are as shown in FIG. 10.

Referring to FIG. 9, the construction of the control is that; the first control conduit 34 and the rear chamber k of the pilot plunger 24 communicate with each other through the guide conduit 38; the second control conduit 35 communicates through the guide conduit 39 with the front chamber b of the pilot plunger 24: the back chamber of the control plunger 21; on the way of the guide conduit 38 communicating with the first control conduit 34 is inserted a solenoid directional control valve 72; a first inlet port $P_1$ of two inlet ports of the valve 72 is connected to the conduit 37 and a second inlet port $P_2$ to the guide conduit 38 communicating with the first control conduit 34; and a first outlet port $P_3$ of two outlet ports of the valve 72 is connected to the pump T and a second outlet port $P_4$ to the guide conduit 38 communicating with the rear chamber k.

At a first position of the valve 72 are connected the first inlet port $P_1$ and the second outlet port $P_4$ with each other, and are closed the second inlet port $P_2$ and the first outlet port $P_3$; at a second position of the same is opened each port to communicate with each other and led to the sump line 40; and at a third position are connected the second inlet port $P_2$ and outlet port $P_4$ with each other and are closed the first inlet port $P_1$ and outlet port $P_3$.

Incidentally, the valve 72 occasionally has the two positions instead of the three positions, neglecting the center position thereof, however, the second position is available for no load running in tool's idling.

The valve 72 mainly employs the solenoid control valve, but a manual control may be available. The solenoid three position control valve requires solenoids $S_1$ and $S_2$ provided at both sides of the valve, and if the two position valve is used, one of the solenoids may be a spring.

Now, operation of the pump of the aforesaid structure will be described in the following.

First, the two pressure-two volume control automatically carried out by system pressure: the combination control by system pressure, has the pressure preset by the pressure adjust screws 32 and 33 for changing the control from the low pressure-large volume to the high pressure-small voltage.

In this control system, the solenoid $S_1$ at the right side in FIG. 9 is excited and the directional control valve 72 is set at the position shown in FIG. 9. Hence, the control conduit 34 at the low pressure line is directly connected to the rear chamber R of back chamber of the control plunger, and the conduit 37a communicating with the high pressure line conduit 37 is closed. The condition in FIG. 9 is the same as that in FIG. 1, in which the two pressure-two volume control of low pressure-large volume and high pressure-small volume, namely, the discharge pressure-flow rate characteristics shown by the curve C in FIG. 10, is automatically obtainable by the system pressure control through the process seen from FIG. 1 so that the pump may be controlled under the low pressure-large volume ($P_1$, $Q_2$) and high pressure-small volume ($P_2$, $Q_1$) at the curve C in FIG. 1, in which the low and high pressure $P_1$ and $P_2$ are as aforesaid optional to be set.

Second, the two pressure-two volume control not with the combination control by system pressure but with operation of the directional control valve 72, is that the valve 72 may be changed to desirably select the pressure of the low pressure-large volume and the high-small control, where manupulation, catching the pressure rise, or operating the solenoid valve with a limit switch at the tool's travelling range, is available for changing the valve 72.

The two pressure-two volume control by this system, similar to the combination control by system pressure, is that the rightside solenoid $S_1$ is excited, the valve 72 is set to be located as shown in FIG. 9, and when the tool attached to the actuator reaches just before a workpiece, the leftside solenois $S_2$ is excited to displace the valve 72 to the left position from that in FIG. 9.

The valve-changing allows the conduit 37a at the high pressure line conduit 37 to communicate with the guide conduit 38 and with the rear chamber k therethrough, thus the discharge pressure being directly led to the chamber k from the high pressure conduit 37, thereupon, if the discharge pressure exceeds, as in the construction shown in FIG. 5, the sum of the swash plate 11 inclined moment and the spring 13 force, the pilot plunger 24 initiates its travel without delay so that the control plunger 21 is forced to rightward travel resulting in decreasing the swash plate slant angle. Consequently, the discharge amount of the small volume $Q_1$ allows the tool cooperable with the actuator to approach the workpiece in slow traverse, the tool finally coming in contact therewith without any impact.

Also, since the discharge port 19 is as aforesaid led to the spool chamber 27 through the high pressure line conduit 37 and the guide conduit 29, the spool 23 therein tries to travel under the high pressure, but is impermissible of its travel due to the biasing force of the push member 31 abutting against the spool, which force exceeds the discharge pressure until it reaches $Pc_1$. When the discharge pressure becomes over $Pc_1$, the spool 23 travels to urge the push member 31 to open the port 35, hence, the opened port 35 applies the control pressure to the front chamber b to cause the control plunger 21 to travel resulting in raising up the swash plate 11 as the same as the aforesaid case. Consequently, the swash plate is lessened in its slant angle until it becomes zero so as to make the discharge amount zero, thus, the characteristics shown by the curve F in FIG. 10 being obtained.

Hence, from the aforesaid operation, the pump can be changed from the low pressure-large volume to high pressure-small volume control at an optional pressure stage so as to be effectively applicable of machining the workpiece.

As is clearly seen from the aforesaid description, the hydraulic pump of the invention is capable of exerting with a single pump the two pressure-two volume control and is further precise and stable in setting the low and high fluid pressure thereof.

There are suggested, as the two pressure-two volume control system in the hydraulic pump, the three control systems: the combination control by system pressure automatical to act by load pressure alternation, the combination control by directional control valve employing the directional control valve's operation, and the combination control of composite type combined of both the above systems.

Each of the control systems is desirably selectable in manufacturing process, however, the control system once selected to be assembled in the pump, should be restricted to this selected system only so that it is impossible for the pump in duty to select another system.

Such a problem is solvable by the method that at either one of the housing body 1, the cover 2 and the valve block 25 is formed each of the conduits opening at one side thereof, three kinds of control block communicating with each of the conduits are formed in coincidence with the aforesaid control system respectively, and one of the control blocks is optionally selected to be detachably mounted to either one of the housing body 1, the cover 2 and the valve block 25.

Next, the valve block 25 will be exemplified for the above constitution as follows:

The valve block 25 is, as shown in FIG. 11, provided with the guide conduits 28 and 29, the first control conduit 34, the second control conduit 35, the high pressure line conduit 37 connected to the discharge port 19, the control pressure introducing conduit 38 communicating with the rear chamber k of the pilot plunger 24, the sump line 40, and the connecting conduit 41, which conduits are all opened at one side of the valve block 25.

In addition, the valve block 25 may be fixed to the upper portion of the housing A by means of mount bolts (not shown) or be integrated with the housing body 1. In the former case, the second control conduit 35 at the valve block 25 communicates with the guide conduit 39 connected to the front chamber b of the pilot plunger 24, the control flind pressure introducing conduit 38 does with the rear chamber k of the pilot plunger 24, the high pressure line conduit 37 does with the discharge port 19, and the sump line 40 does with the interior of the housing body 1, these conduits being communicating with each outer through three kinds of control blocks 50, 60 and 70, to be hereinafter described, thus the swash plate 11 can be controlled with either one of the combination control by system pressure, that by directional control valve, and that of composite type.

The control blocks 50, 60 and 70 are formed to be detachable mounted to one side of the valve block 25. The control blocks have at one side thereof ports which are as many as the ports of conduits at the one side of the valve block 25 and have the relation of being located in coincidence with the ports of conduits, so that the hydraulic pump of one of the control systems is completed by attaching any one of the control blocks to the valve block 25. Incidentally, being opened at the one side of the valve block 25, each of the conduits may be opened at one side of the housing body 1 or the cover 2.

Now, first, the control block 50 for the combination control by system pressure will be described as follows:

The block 50 is, as shown in FIG. 12, provided with a first fluid passage 51 connecting the high pressure line conduit 37 at the valve block 25 to the guide conduits 28 and 29, a second passage 52 for connecting the low pressure line control conduit 34 to the control pressure introducing conduit 38, and a third passage 53 for connecting the sump line 40 to the connecting conduit 41.

The attachment of the block 50 to the valve block 25 allows the guide conduits 28 and 29 at one end of each of the spool chambers 26 and 27 to communicate through the first passage 51 with the high pressure line conduit 37 connected to the discharge port 19, the low pressure line control conduit 34 to communicate with the control pressure introducing conduit 38 through the second passage 52, and the sump line 40 and the connecting conduit 41 to communicate with each other through the third passage 53 to thereby make open the rear sides of the spools 22 and 23 respectively.

Under these conditions, when the drive shaft 5 is rotated to work the pump the fluid of the maximum flow rate flows out from the discharge port 19 to the discharge line 36 so that the fluid discharge pressure may be introduced through the guide conduits 28 and 29 into the one end side of each of the spools 22 and 23 from the discharge conduit 19, the high pressure line conduit 37, and the first passage 51. Upon rise of the discharge pressure (load pressure) the spool 22, at first, travels rightward, the control conduit 34 opens into the spool chamber, the fluid control pressure is led to the rear chamber k from the conduit 34 through the second passage 52 and the control pressure introducing conduit 38. the pilot plunger 24 is rightward moved, and the swash plate 11 is decreased in its slant angle, thereafter, when the discharge pressure further rises, the spool 23 rightward travels to open the control conduit 35, and the control pressure is introduced therefrom into the front chamber b to rightward move the control plunger 21 thereby making minimum the swash plate slant angle. Thus, the pump can work under the automatic control of two pressures ($P_1$, $P_2$) and two volumes ($Q_1$, $Q_2$) as shown by the characteristic curves in FIG. 2, by means of the system pressure.

Second, the control block 60 for the combination control by directional control valve comprises, as shown in FIG. 13, combination of a block body 61 and a directional control valve 62. The valve 62 employs an solenoid valve of four external ports and two positions as the same as in FIG. 5 and the block body 61 is provided with; a first passage 63 communicating a first port P of the electro magnetic valve with the high pressure line conduit 37; a second passage 64 communicating a second port T with the sump line 40; a third passage 65 communicating a third port A with the guide conduit 28 for the spool 22; a fourth passage 66 communicating a fourth port B with the guide conduit 29 for the spool 23 and the fluid control pressure introducing conduit 38; and a fifth passage 67 communicating the low pressure line control conduit 34 with the connecting conduit 41.

By attaching the block 60 to the valve block 25 and operating the solenoid control valve 62 as is positioned shown in FIG. 13; the guide conduit 28 at one end side of the spool 22 communicates through the third passage 65, the electromagnetic directional control valve 62 and the first passage 63, with the high pressure line conduit 37 connecting to the discharge conduit 19; the low pressure line control conduit 34 communicates with the connecting conduit 41 through the fifth passage 67 and with the front chamber b of the back chamber of the control plunger 21 through the connecting conduit 41, the rear side of the spool 23, and the control conduit 35; and the fluid control pressure introducing conduit 38 connecting to the rear chamber k and the guide conduit 29 for the spool 23, communicates with the sump line 40 through the fourth passage 66, the solenoide directional control valve 62, and the second conduit 64 respectively.

The pump running under these conditions leads the discharge pressure to the one end side of the spool 22, and upon rise of the pressure the spool 22 rightward travels to open the control conduit 34 from which the control pressure is introduced into the front chamber b of the back chamber of the control plunger 21 through the aforesaid low pressure line including the fifth passage 67, and the operating plunger is allowed to rightward travel so as to decrease the swash plate slant angle so that the discharge amount becomes zero at the low pressure $Pm_1$ settled by the push member 30. In this instance, the control corresponds to the low pressure-large volume ($Pm_1$, $Q_2$) as shown by the curve D in FIG. 6. Next, the high pressure-small volume control ($Pc_1$, $Q_1$) as shown by the curve E in FIG. 6, can be carried out by directionally changing the control valve 62 reversely to the position in FIG. 13. The valve-changing permits the high pressure conduit 37 to be communicated through the first passage 63, the solenoid control valve 62 and the fourth passage 66, with the guide conduit 29 for the spool 23 and with the control pressure introducing conduit 38 connected to the rear chamber k; and the guide conduit 28 for the spool 22 communicates with the sump line 40 through the third passage 65, the solenoid control valve and the second passage 64.

Thus, the discharge pressure is introduced into the rear chamber k of the pilot plunger 24 as well as the one end side of the spool 23. At this time, when the discharge pressure exceeds the sum of the inclined moment of the swash plate 11 and the force of the spring 13, the pilot plunger 24 immediately rightward travels to reduce the swash plate slant angle thereby controlling the pump under the high pressure-small volume characteristic control. Upon a further rise of the pressure the spool 23 travels to control the pump at the maximum discharge pressure and zero discharge amount as shown by th curve E in FIG. 6.

Hence, the use of the control block 60 and operation of the directional control valve 62, make it possible to obtain the characteristics of the two pressure-two volume control as shown in FIG. 6: those of the low pressure-large volume and high pressure-small volume.

Third, the control block 70 for the combination control of composite type, which is, as the same as the aforesaid control valve 60, combined with the block body 71 and the directional control valve 72, employs a solenoid control valve similar to the abovementioned directional control valve 62 used in the control block 60. The block body 71 is, as shown in FIG. 14, provided with; a first passage 73 communicating a first port P of the solenoid valve 72 with the control pressure introducing conduit 38; a second passage 74 communicating a second port T of the valve with the sump line 40 and connecting conduit 41; a third passage 75 communicating a third port A of the valve with the low pressure control conduit 34; and a fourth passage 76 communicating a fourth port B of the valve with the guide conduits 28 and 29 and the high pressure conduit 37, and further both the guide and pressure conduits with each other.

The attachment of the control block 70 to the valve block 25 is available for the composite type control. The combination control of composite type means the control of composite characteristics obtainable of the two pressure-two volume control combined with both the combination control by system pressure and the high pressure-small volume control at the combination control by directional control valve. The composite type control becomes the same control circuit as the combination control by system pressure as shown in FIG. 12 by attaching the control block 70 to the valve block 25 and using the solenoid valve 72 at its position as shown in FIG. 14 so that the two pressure-two volume control may automatically be applicable by means of the system pressure as shown by the characteristic curves in FIG. 2, while, by displacing the control valve 72 reversely to the position shown in FIG. 14 is formed the control circuit similar to the high pressure-small volume control circuit at the combination control by directional control valve shown in FIG. 13 to thereby make it possible to exert the high pressure-small volume control represented with the curve E in FIG. 6.

Briefly, when the control valve 72 is used at the position as indicated in FIG. 14, the guide conduits 28 and 29 communicates with the high pressure line conduit 37 through the forth passage 76 respectively and the low pressure line control conduit 34 communicates with the fluid control pressure introducing conduit 38 through the third passage 75, the solenoid control valve 72 and the first passage 73, on the contrary, when the control valve 72 is displaced reversely to the position shown in FIG. 14, the fluid control pressure introducing conduit 38 communicates with the high pressure line conduit 37 through the first passage 73, the control valve 72 and the fourth passage 76.

In greater detail, the high pressure conduit 37, as the same as the circuit of high pressure-small volume control characteristic at the control valve system in FIG. 13, communicates with both the one end side of the spool 23 and the rear chamber k of the pilot plunger 24, to which the discharge pressure in the conduit 37 is applied. Hence, the discharge pressure over the sum of the force of the spring 13 and the inclined moment of the swash plate 11, causes the pilot plunger 24 to immediately rightward travel to decrease the swash plate slant angle to result in controlling the pump in the high pressure-small volume characteristics shown by the curve E in FIG. 6, thereafter. When the discharge pressure further rises until it exceeds the biasing force of the push member 31, the spool 23 travels to urge the member, and the control conduit 35 is opend to lead therethrough the fluid pressure to the control plunger 21 to be rightward moved so that the slant angle of the swash plate 11 is made zero at the maximum discharge pressure and so the discharge amount, where the fluid high pressure being also led into the control conduit 34 by dislacing the spool 22 through the guide conduit 28, the third port A of the control valve 72 is closed to make the spool 22 irrelevant to the circuit.

In addition, the control blocks 60 and 70 of the aforesaid three control blocks, which are combined with the directional control valves 62 and 72 respectively, may be preassembled integrally with the valves, and if those valves are on sale, the block bodies 61 and 71 are preferred to be separated therefrom.

As is clearly understood from the aforesaid description, the provision of selective one of the three kinds of control block may perform the two pressure-two volume control of three kinds of combination control by system pressure, by directional control valve, and of composite type.

Furthermore, the control blocks adapted to be detachably mounted are selectively usable in each of the aforesaid control systems for meeting working conditions, for example, machining condition.

Accordingly, the housing and cover of the pump are usable in common with respect to any control block so that the variable delivery pump of the invention is easy in process and supervision to manufacture and also in product management, thereby becoming more economical and widely usable.

In addition, the swash plate type axial piston pump has heretofore been explained, but the invention is applicable for all other variable delivery hydraulic piston pumps and the same type vane pumps, in which a tilting yoke, eccentric ring or cam ring, serves as the variable control element.

The aforesaid pump of the invention all having one pilot plunger respectively, two or more plungers may be provided.

While various embodiments of the invention have been shown and described, the invention is not limited to the specific construction thereof, which is merely exemplified in the specification rather than is defined.

What is claimed is:

[1. In a variable delivery hydraulic pump including a housing having a suction and a discharge conduit, a variable control element movable between maximum and minimum displacement positions corresponding, respectively, to a maximum and a minimum fluid discharge amount, a pumping means associated with said variable control element and controlled thereby to vary the fluid control element and controlled thereby to vary the fluid discharge amount of said pumping means between said maximum and minimum amount, the improvement comprising:

a biasing means for constantly urging said variable control element toward said maximum displacement position, a bore, a pilot plunger and a control plunger slidably disposed in said bore with one end of said control plunger in operative engagement with said variable control element for adjusting said displacement position thereof from said maximum to said minimum against the urging of said biasing means, said pilot plunger being slidable with one end thereof in engagement with the other end of said control plunger through a stroke distance to thereby move, engaged with said control plunger, said variable control element from said maximum displacement position to an intermediate displacement position between said maximum and minimum positions, to vary said fluid discharge amount from said maximum amount to a medium amount, said control plunger being slidable through a stroke distance to move said variable control element from said intermediate displacement position to said minimum displacement position to vary said fluid discharge amount from said medium amount to said minimum amount, means for controlling the sliding movement of said pilot and control plungers including first and second spool valves each disposed for axial movement in a spool chamber, each spool chamber having one end thereof in fluid communication with said discharge conduit of said pumping means, so that said spool valves will be exposed to the fluid discharge pressure of said pumping means, first and second push members disposed at the other ends of said first and second spool chambers for engaging the ends, respectively, of said first and second spool valves for urging said spool valves against the fluid discharge pressure from said discharge conduit, said first and second push members exerting different biasing forces on said respective spool valves so that said spool valves will each be caused to move against said respective push members in response to different fluid discharge pressures, a first control conduit for establishing fluid communication from a point intermediate the said ends of said first spool chamber, and thereby from said discharge conduit when said first spool valve is moved past said point towards its said other end, to the other end of said pilot plunger in said bore when said fluid discharge pressure exceeds a medium level to overcome the biasing force of said fist push member, a second control conduit for establishing fluid communication from a point intermediate the said ends of said second spool chamber, and thereby from said discharge conduit when said second spool valve is moved past said point in said second spool chamber toward its said other end, to a point in said bore between said pilot and control plungers when said fluid discharge pressure exceeds a maximum level to overcome the biasing force of said second push member, the biasing force of said fist and second push members being such that said spool valves will be moved thereby to close off said first and second control conduits from said fluid discharge conduit when said fluid discharge pressure is lower than said medium level whereby said biasing means will move said variable control element to its said maximum displacement position to cause said pumping means to discharge said maximum amount of fluid.]

2. The variable delivery hydraulic pump according to claim 1, wherein said first and second push members corresponding to said first and second spool valves are provided with adjusters for controlling the biasing forces of said push members respectively.

3. The variable delivery hydraulic pump according to claim 1, wherein said pilot plunger is provided at substantially the intermediate portion thereof with an adjuster for adjusting the maximum stroke of said pilot plunger.

4. The variable delivery hydraulic pump according to claim 1, wherein said pilot plunger is provided at the rear side thereof with an adjuster for controlling the maximum displacement of said variable control element and the maximum fluid discharge amount.

5. the variable delivery hydraulic pump according to claim 1, wherein the biasing force of said second push member corresponding to said second spool valve is made larger than that of said first push member corresponding to said first spool valve.

[6. The variable delivery hydraulic pump according to claim 1, wherein the biasing force of said first push member corresponding to said first spool valve is made equal to that of said second push member corresponding to said second spool valve.]

[7. The variable delivery hydraulic pump according to claim 1, wherein the biasing force of said first push member corresponding to said first spool valve is made larger than that of said second push member corresponding to said second spool valve.]

8. The variable delivery hydraulic pump according to claim 1 wherein said means for controlling the sliding movement of said pilot and control plungers are disposed in a valve block which is removably attached to said pump housing, said valve block including a plurality of conduit means for establishing fluid communication between said first and second control conduits and said bore of said pilot and control plungers.

9. The variable delivery hydraulic pump as claimed in claim 8, wherein said valve block includes a control block which is removably attached to said valve block, said control block having fluid passage means for establishing fluid communication between said discharge conduit and said valve block.

[10. In a variable delivery hydraulic pump including a housing having a suction and a discharge conduit, a variable control element movable etween maximum and minimum displacement positions corresponding, respectively, to a maximum and a minimum fluid discharge amount, a pumping means associated with said variable control element and controlled thereby to vary the fluid discharge amount of said pumping means between said maximum and minimum amount, the improvement comprising:

a biasing means for constantly urging said variable control element toward said maximum displacement position, a pilot plunger means and a control plunger means for adjusting said displacement position of said variable control element from said maximum to said minimum against the urging of said biasing means, said pilot plunger means having a rear end and being slidable through a limited stroke distance to thereby move said variable control element from said maximum displacement position to an intermediate displacement position between said maximum and minimum positions, to vary said fluid discharge amount from said maximum amount to a medium amount, said control plunger means having a rear end and being slidable through a stroke distance to move said variable control element from said intermediate displacement position to said minimum displacement position to said minimum displacement position to vary said fluid discharge amount from said medium amount to said minimum amount, means for controlling the sliding movement of said pilot and control plunger means including first and second spool valves each disposed for axial movement in first and second spool chambers, respectively, each spool chamber having one end thereof in fluid communication with said discharge conduit of said pumping means, so that said spool valves will be exposed to the fluid discharge pressure of said pumping means, first and second push members disposed at the other ends of said first and second spool chambers for engaging the ends, respectively, of said first and second spool valves for urging said spool valves against the fluid discharge pressure from said discharge conduit, said first and second push members exerting different biasing forces on said respective spool valves so that said spool valves will each be caused to move against said respective push members in response to different fluid discharge pressures, a first control conduit for establishing fluid communication from a point intermediate the said ends of said first spool chamber, and thereby from said discharge conduit when said first spool valve is moved past said point toward its said other end, to the rear end of said pilot plunger means when said fluid discharge pressure exceeds a medium level to overcome the biasing force of said first push member, a second control conduit for establishing fluid communication from a point intermediate the said ends of said second spool chamber, and thereby from said discharge conduit when said second spool valve is moved past said point in said second spool chamber toward its said other end, to the ear end of said control plunger means when said fluid discharge pressure exceeds a maximum level to overcome the biasing force of said second push member, the biasing force of said first and second push members being such that said spool valves will be moved thereby to close off said first and second control conduits from said fluid discharge conduit when said fluid discharge pressure is lower than said medium level whereby said biasing means will move said variable control element to its said maximum level displacement position to cause said pumping means to discharge said maximum amount of fluid.]

[11. In a variable delivery hydraulic pump having a housing having a suction and a discharge conduit, a variable control element movable between maximum and minimum displacement positions corresponding, respectively, to a maximum and a minimum discharge amount, a pumping means associated with said variable control element and controlled thereby to vary the fluid discharge amount of said pumping means between said maximum and minimum amount, the improvement comprising:

a biasing means for constantly urging said variable control element toward said maximum displacement position, a pilot plunger means and a control plunger means each having a rear end and each slidably disposed in said housing in operative engagement with said variable control element for adjusting said displacement position thereof from said maximum to said minimum against the urging of said biasing means, said pilot plunger means being slidable through a stroke distance that is limited to thereby move said variable control element from said maximum displacement position to an intermediate displacement position between said maximum and minimum positions to vary said fluid discharge amount from said maximum amount to a medium amount, said control plunger means being slidable through a stroke distance to move said variable control element from said intermediate displacement position to said minimum displacement position to vary said fluid discharge amount from said medium amount to said minimum amount, means for controlling the sliding movement of said pilot and control plunger means including first and second spool valves each disposed for axial movement in a first and a second spool chamber, respectively, said first spool chamber of said first spool valve having one end thereof in fluid communication with said discharge conduit of said pumping means so that said first spool valve will be exposed to the fluid discharge pressure of said pumping means, first and second push members disposed at the other ends of said first and second spool chambers for engaging the ends, respectively, of said first and second spool valves for urging said spool valves against fluid pressure from said discharge conduit, said first and second push members exerting different biasing forces on said respective spool valves so that said spool valves will each be caused to move against said respective push members in response to different fluid discharge pressures, a first control conduit for establishing fluid communication from a point intermediate the said ends of said first spool chamber, and thereby from said discharge conduit when said first spool valve is moved past said point towards its said other end, to the rear end of said pilot plunger means when said fluid discharge pressure exceeds a medium level to overcome the biasing force of said first push member, said first control conduit having a branch for passing fluid under pressure to said second spool valve, a second control conduit for establishing fluid communication from a point intermediate the said ends of said second spool chamber, and thereby from said discharge conduit through said first control conduit when said second spool valve is moved past said point in said second spool chamber toward its said other end, to the rear end of said control plunger means when said fluid discharge pressure exceeds a maximum level to overcome the biasing force of said second push member, the biasing force of said first and second push members being such that said spool valves will be moved thereby to close off said first and second control conduits from said fluid discharge conduit when said fluid discharge pressure is lower than said medium level whereby said biasing means will move said variable control element to its said maximum displacement position to cause said pumping means to discharge said maximum amount of fluid.]

*12. In a variable delivery hydraulic pump including a housing having a suction and a discharge conduit, a variable control element movable between maximum and minimum displacement positions corresponding, respectively, to a maximum and a minimum fluid discharge amount, a pumping means associated with said variable control element and controlled thereby to vary the fluid discharge amount of said pumping means between said maximum and minimum amount, the improvement comprising:*

*a biasing means for constantly urging said variable control element toward said maximum displacement position, a bore, a pilot plunger and a control plunger slidably disposed in said bore with one end of said control plunger in operative engagement with said variable control element for adjusting said displacement position thereof from said maximum to said minimum against the urging of said biasing means, said pilot plunger being slidable with one end thereof in engagement with the other end of said control plunger through a stroke distance to thereby move, engaged with said control plunger, said variable control element from said maximum displacement position to an intermediate displacement position between said maximum and minimum positions, to vary said fluid discharge amount from said maximum amount to a medium amount, said control plunger being slidable through a stroke distance to move said variable control element from said intermediate displacement*

*position to said minimum displacement position to vary said fluid discharge amount from said medium amount to said minimum amount,*

*means for controlling the sliding movement of said pilot and control plungers including first and second spool valves each disposed for axial movement in a spool chamber, said first spool valve being movable independently of the position of said pilot plunger, each spool chamber having one end thereof in fluid communication with said discharge conduit of said pumping means, so that said spool valves will be exposed to the fluid discharge pressure of said pumping means, first and second push members disposed at the other ends of said first and second spool chambers for engaging the ends, respectively, of said first and second spool valves for urging said spool valves against the fluid discharge pressure from said discharge conduit, said first and second push members exerting different biasing forces on said respective spool valves so that said spool valves will each be caused to move against said respective push members in response to different fluid discharge pressures, a first control conduit for establishing fluid communication from a point intermediate the said ends of said first spool chamber, and thereby from said discharge conduit when said first spool valve is moved past said point towards its said other end, to the other end of said pilot plunger in said bore when said fluid discharge pressure exceeds a medium level to overcome the biasing force of said first push member, a second control conduit for establishing fluid communication from a point intermediate the said ends of said second spool chamber, and thereby from said discharge conduit when said second spool valve is moved past said point in said second spool chamber toward its said other end, to a point in said bore between said pilot and control plungers when said fluid discharge pressure exceeds a maximum level to overcome the biasing force of said second push member, the biasing force of said first and second push members being such that said spool valves will be moved thereby to close off said first and second control conduits from said fluid discharge conduit when said fluid discharge pressure is lower than said medium level whereby said biasing means will move said variable control element to its said maximum displacement position to cause said pumping means to discharge said maximum amount of fluid.*

*13. In a variable delivery hydraulic pump including a housing having a suction and a discharge conduit, a variable control element movable between maximum and minimum displacement positions corresponding, respectively, to a maximum and a minimum fluid discharge amount, a pumping means associated with said variable control element and controlled thereby to vary the fluid discharge amount of said pumping means between said maximum and minimum amount, the improvement comprising:*

*a biasing means for constantly urging said variable control element toward said maximum displacement position, a pilot plunger means and a control plunger means for adjusting said displacement position of said variable control element from said maximum to said minimum against the urging of said biasing means, said pilot plunger means having a rear end and being slidable through a limited stroke distance to thereby move said variable control element from said maximum displacement position to an intermediate displacement position between said maximum and minimum positions, to vary said fluid discharge amount from said maximum amount to a medium amount, said control plunger means having a rear end and being slidable through a stroke distance to move said variable control element from said intermediate displacement position to said minimum displacement position to vary said fluid discharge amount from said medium amount to said minimum amount,*

*means for controlling the sliding movement of said pilot and control plunger means including first and second spool valves each disposed for axial movement in first and second spool chambers, respectively, said first spool valve being movable independently of the position of said pilot plunger means, each spool chamber having one end thereof in fluid communication with said discharge conduit of said pumping means, so that said spool valves will be exposed to the fluid discharge pressure of said pumping means, first and second push members disposed at the other ends of said first and second spool chambers for engaging the ends, respectively, of said first and second spool valves for urging said spool valves against the fluid discharge pressure from said discharge conduit, said first and second push members exerting different biasing forces on said respective spool valves so that said spool valves will each be caused to move against said respective push members in response to different fluid discharge pressures, a first control conduit for establishing fluid communication from a point intermediate the said ends of said first spool chamber, and thereby from said discharge conduit when said first spool valve is moved past said point toward its said other end, to the rear end of said pilot plunger means when said fluid discharge pressure exceeds a medium level to overcome the biasing force of said first push member, a second control conduit for establishing fluid communication from a point intermediate the said ends of said second spool chamber, and thereby from said discharge conduit when said second spool valve is moved past said point in said second spool chamber toward its said other end, to the rear end of said control plunger means when said fluid discharge pressure exceeds a maximum level to overcome the biasing force of said second push member, the biasing force of said first and second push members being such that said spool valves will be moved thereby to close off said first and second control conduits from said fluid discharge conduit when said fluid discharge pressure is lower than said medium level whereby said biasing means will move said variable control element to its said maximum level displacement position to cause said pumping means to discharge said maximum amount of fluid.*

*14. In a variable delivery hydraulic pump having a housing having a suction and a discharge conduit, a variable control element movable between maximum and minimum displacement positions corresponding, respectively, to a maximum and a minimum discharge amount, a pumping means associated with said variable control element and controlled thereby to vary the fluid discharge amount of said pumping means between said maximum and minimum amount, the improvement comprising:*

*a biasing means for constantly urging said variable control element toward said maximum displacement position, a pilot plunger means and a control plunger means each having a rear end and each slidably disposed in said housing in operative engagement with said variable control element for adjusting said dis-*

*placement position thereof from said maximum to said minimum against the urging of said biasing means, said pilot plunger means being slidable through a stroke distance that is limited to thereby move said variable control element from said maximum displacement position to an intermediate displacement position between said maximum and minimum positions to vary said fluid discharge amount from said maximum amount to a medium amount, said control plunger means being slidable through a stroke distance to move said variable control element from said intermediate displacement position to said minimum displacement position to vary said fluid discharge amount from said medium amount to said minimum amount,*

*means for controlling the sliding movement of said pilot and control plunger means including first and second spool valves each disposed for axial movement in a first and a second spool chamber, respectively, said first spool valve being movable independently of the position of said pilot plunger means, said first spool chamber of said first spool valve having one end thereof in fluid communication with said discharge conduit of said pumping means so that said first spool valve will be exposed to the fluid discharge pressure of said pumping means, first and second push members disposed at the other ends of said first and second spool chambers for engaging the ends, respectively, of said first and second spool valves for urging said spool valves against fluid pressure from said discharge conduit, said first and second push members exerting different biasing forces on said respective spool valves so that said spool valves will each be caused to move against said respective push members in response to different fluid discharge pressures, a first control conduit for establishing fluid communication from a point intermediate the said ends of said first spool chamber, and thereby from said discharge conduit when said first spool valve is moved past said point towards its said other end, to the rear end of said pilot plunger means when said fluid discharge pressure exceeds a medium level to overcome the biasing force of said first push member, said first control conduit having a branch for passing fluid under pressure to said second spool valve, a second control conduit for establishing fluid communication from a point intermediate the said ends of said second spool chamber, and thereby from said discharge conduit through said first control conduit when said second spool valve is moved past said point in said second spool chamber toward its said other end, to the rear end of said control plunger means when said fluid discharge pressure exceeds a maximum level to overcome the biasing force of said second push member, the biasing force of said first and second push members being such that said spool valves will be moved thereby to close off said first and second control conduits from said fluid discharge conduit when said fluid discharge pressure is lower than said medium level whereby said biasing means will move said variable control element to its said maximum displacement position to cause said pumping means to discharge said maximum amount of fluid.*

* * * * *